Aug. 14, 1945.    J. A. MAURER, JR    2,381,979
SOUND FILM PRINTING OPTICAL SYSTEM
Filed Aug. 28, 1943    4 Sheets-Sheet 1
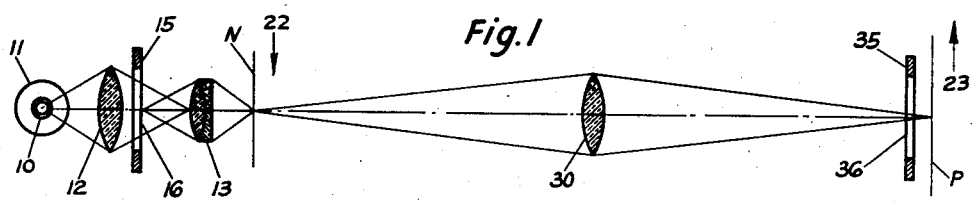
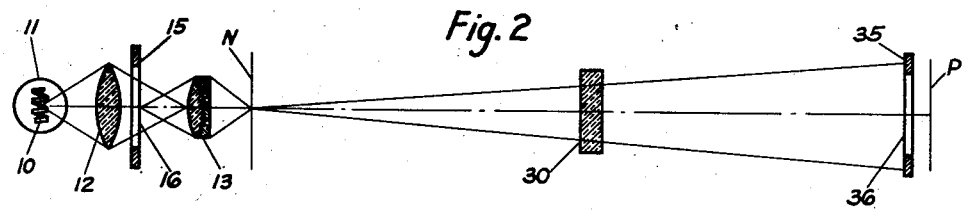
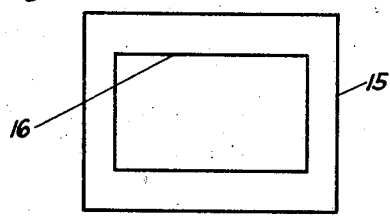
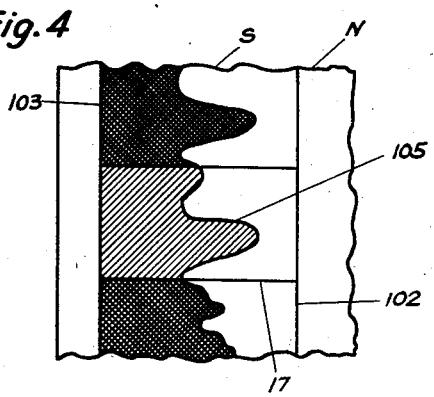
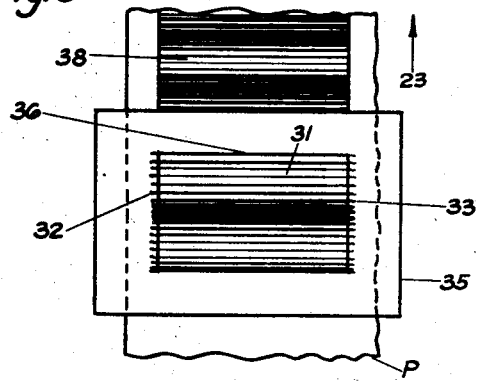
INVENTOR:
John A. Maurer, Jr.
BY
AGENT

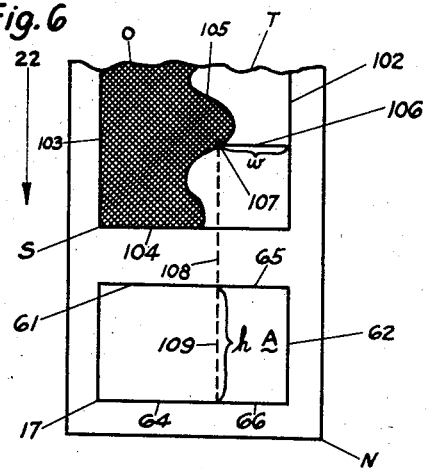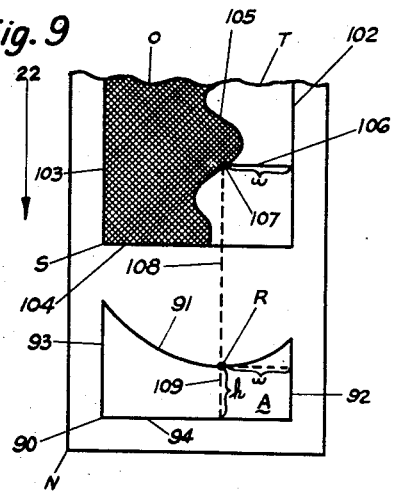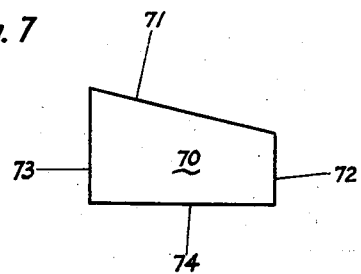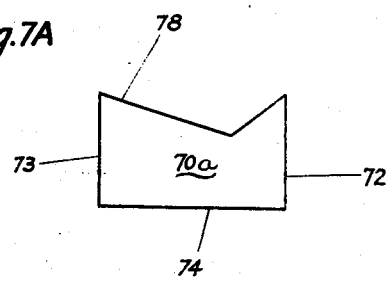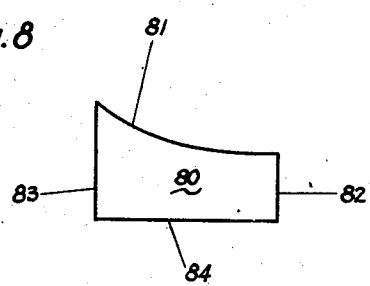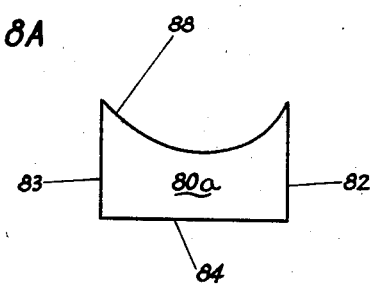

INVENTOR:
John A. Maurer, Jr.
BY
AGENT

Aug. 14, 1945.  J. A. MAURER, JR  2,381,979
SOUND FILM PRINTING OPTICAL SYSTEM
Filed Aug. 28, 1943   4 Sheets-Sheet 4

INVENTOR:
John A. Maurer, Jr.
BY
AGENT

Patented Aug. 14, 1945

2,381,979

UNITED STATES PATENT OFFICE 2,381,979

SOUND FILM PRINTING OPTICAL SYSTEM

John A. Maurer, Jr., New York, N. Y., assignor to J. A. Maurer, Inc., New York, N. Y., a corporation of New York Application August 28, 1943, Serial No. 500,393

14 Claims. (Cl. 88—24)

This invention relates to optical systems for sound track printers and, more particularly, it relates to optical systems of this kind by which a variable area sound track may be converted into a variable density sound track.

Still more particularly, the invention relates to sound printing optical systems in which the conversion of the variable area sound track into the variable density sound track is effected substantially as follows. First, a uniformly illuminated light spot is formed in such a manner that it is more or less obscured when a negative film having the variable area sound track thereon moves vertically through a plane at right angles to the optical axis of the system. Then, the light flux emanating from the uniformly illuminated light spot is, in the vertical plane, forcused at a position in the optical system while, in the horizontal plane, it is diffused at that position. Thus, there is formed at that position an image of the uniformly illuminated light spot as obscured by the variable area sound track, which image is a light spot of vertically varying illumination. Finally, the light flux emanating from the light spot of vertically varying illumination is employed to effect the exposure of a positive film which moves vertically through another plane at right angles to the optical axis of the system, and thereby the variable density sound track is produced on the positive film.

Conversion sound printing optical systems of this type are disclosed, for example, in Sandvik et al. Patent No. 2,298,422, issued October 13, 1942, and in my copending applications Serial Nos. 449,797, now Patent Number 2,366,040 issued December 26, 1944, and 449,798, filed July 4, 1942, and assigned to the same assignee as this application. In all of those optical systems the uniformly illuminated light spot is of a rectangular shape so as to have two straight and parallel horizontal edges. The distance from one another of the horizontal edges of the uniformly illuminated light spot, that is, its vertical extension, or height, therefore is constant at all points on the horizontal edges. This shape of the uniformly illuminated light spot results in a linear relationship between the exposure of the positive film and the horizontal extension, or width, of the transparent portion of the variable area sound track, whose opaque portion more or less obscures the uniformly illuminated light spot.

The light transmission of a developed film, however, is not linearly related to its exposure. Thus, since in the conversion sound printing optical systems of Patent Nos. 2,298,422 and 2,366,040 and application Serial No. 449,798 the exposure of the positive film is linearly related to the width of the transparent portion of the variable area sound track, the light transmission of the variable density sound track will not be linearly related thereto after the positive film has been developed. Distortions, therefore, would occur if sound were reproduced directly from the variable density sound track on the developed positive film. For that reason, it has been necessary heretofore to transfer the variable density sound track from the positive film onto another film by a further printing operation. For the same reason, it furthermore has been necessary to employ, as the positive film and the film onto which the further print of the variable density sound track was made, only those kinds of film stock whose emulsion characteristics approach linearity over as wide a range as possible and, moreover, to employ them in such a manner that effective use was made of only the straight portions of their emulsion characteristics. The first of these requirements excludes the employment of a number of film stocks now available which, except for their emulsion characteristics, would make excellent sound track carriers, and the second requirement results in an objectionable restriction of the volume range of the sound reproduced from the final print of the variable density sound track.

For the purpose, therefore, of producing on the positive film a variable density sound track from which undistorted sound can be reproduced directly, and/or for the purpose of making possible the employment, without causing distortions on account of the non-linearity of its emulsion characteristic, of any kind of film stock as the positive film and, if desired, the film onto which a further print of the variable density sound track is made, and/or for the purpose of effectively enhancing the volume range of the reproduced sound, it is desirable to establish, in the conversion sound printing optical systems of the type under discussion, a non-linear relationship between the width of the transparent portion of the variable area sound track and the exposure of the positive film so as to compensate for the non-linearity of the emulsion characteristic of either the positive film or both the positive film and the film onto which the variable density sound track is to be printed from the positive film. That is to say, the non-linear relationship must be of such a character that a linear relationship is established between said width and the light transmission of the variable density sound track after the film, or films, have been developed. This compensating non-linear relationship, however, is merely an example of a non-linear relationship which it is desirable to establish, in the conversion sound printing optical systems of the type under discussion, between the width of the transparent portion of the variable area sound track and the exposure of the positive film. In order to produce variable density sound tracks of certain characteristics other than those discussed hereinbefore, it may also be desirable to establish, in those optical systems, non-linear relationships between said width and said exposure which are of a second degree, a third degree, a complex, or any other character, depending upon the particular requirements of a given actual case.

It will readily be understood by those skilled in the art that the means for establishing non-linear relationships of the kind described in the preceding paragraph preferably are such that they may conveniently be introduced into the optical systems of the type under discussion, and that they may be manufactured with comparative ease and yet with any desired degree of accuracy.

It is, therefore, the primary object of the invention to provide, in conversion sound printing optical systems of the type under discussion, means for establishing a non-linear relationship between the width of the transparent portion of the variable area sound track and the exposure of the positive film.

A further object of the invention is to provide, in those optical systems, means for establishing a non-linear relationship between said width and said exposure which is of a second degree character.

Another object of the invention is to provide, in those optical systems, means for establishing a non-linear relationship between said width and said exposure which is of a third degree character.

Another object of the invention is to provide, in those optical systems, means for establishing a non-linear relationship between said width and said exposure which is of a complex character.

Another object of the invention is to provide, in those optical systems, means for establishing a non-linear relationship between the width of the transparent portion of the variable area sound track and the exposure of the positive film which is of such a character that a linear relationship is established between said width and the light transmission of the variable density sound track after the positive film has been developed.

Another object of the invention is to provide, in those optical systems, means for establishing a non-linear relationship between the width of the transparent portion of the variable area sound track and the exposure of the positive film which is of such a character that a linear relationship is established between said width and the light transmission of the variable density sound track after development of a film onto which the variable density sound track has been printed from the positive film.

Another object of the invention is the provision of means for establishing non-linear relationships of the kind described which may conveniently be introduced into those optical systems.

Another object of the invention is the provision of such means which may easily be manufactured.

Another object of the invention is the provision of such means which may be manufactured with any degree of accuracy.

Another object of the invention is the provision, in conversion sound printing optical systems of the type under discussion, of means making possible the employment, as carrier of the variable density sound track, of any kind of film stock irrespective of its emulsion characteristic and without causing distortions resulting from the non-linearity thereof.

Another object of the invention is the provision, in those optical systems, of means by which the volume range of the sound reproduced from the developed variable density sound track is effectively enhanced.

Another object of the invention is the provision of conversion sound printing optical systems in which a variable density sound track is produced from which undistorted sound can be reproduced directly.

Still other objects and advantages of the invention include those which are hereinafter stated or apparent, or which are incidental to the invention.

The objects of the invention are substantially achieved by providing, in conversion sound printing optical systems of the type under discussion, means for defining the shape of the uniformly illuminated light spot referred to hereinabove in such a manner that the exposure of the positive film is non-linearly related to the width of the transparent portion of the variable area sound track. To that end, the shape of the uniformly illuminated light spot is defined so that the light spot has two horizontal edges and that its height, that is, the distance of its horizontal edges from one another, varies. As will be explained in detail hereinafter, the law governing the variation of the height of the uniformly illuminated light spot can be chosen so that a non-linear relationship of any desired character may be established between said width and said exposure. In the presently preferred embodiments of the invention, the means defining the shape of the uniformly illuminated light spot include a screen with an opening whose outline corresponds to the desired shape of the uniformly illuminated light spot. This screen and opening may take the place of a screen and opening ordinarily employed in the printing optical system, or they may be additional thereto, as will be pointed out hereinafter.

In the foregoing brief explanation of the state of the art and summary of the invention, and throughout the present specification, the terms "vertical," "vertical direction," and "vertical plane," and "horizontal," "horizontal direction," and "horizontal plane," and the term "coordinate planes," are used as defined in Patent No. 2,366,040 and application Serial No. 449,798, to which definitions reference is therefore made. Reference is also made to the definitions contained in those applications of the terms "negative film" and "positive film," and "plane of the negative film" and "plane of the positive film," which terms are used throughout this specification as defined in those applications.

Furthermore, the term "variable area sound track" is used throughout this specification as including the two kinds of variable area sound track known in the art as unilateral and bilateral, or symmetrical, variable area sound tracks. Wherever it seemed necessary to distinguish between these two kinds of variable area sound tracks, this has been done by expressly referring to a unilateral or a symmetrical variable area sound track. In any case, the term also includes any noiseless variable area sound tracks, be they produced by the bias, or by the shutter, noiseless method.

Finally, the term "illumination" is used throughout this specification as referring to the amount of light flux per unit area. The description, for example, of a light spot as being of uniform illumination means that the light flux contained in the light spot is distributed over its area in such a manner that the amounts of light flux at any two points thereon are equal. Correspondingly, the description of a light spot as being of vertically varying illumination means that the light flux contained in the light spot is distributed over its area in such a manner that the amounts of light flux at any two points thereon which are on different horizontal levels thereof, are, in general, different.

The invention will be better understood when the following description is considered with the accompanying drawings of several presently preferred embodiments thereof, and its scope will be pointed out in the appended claims.

In the drawings:

Fig. 1 is a diagrammatic longitudinal section in the vertical plane of a conversion sound printing optical system to which the present invention is applicable.

Fig. 2 is a corresponding section in the horizontal plane.

Fig. 3 is an elevation of a screen with an opening shown in Figs. 1 and 2.

Fig. 4 is an enlarged elevation of the negative film having thereon a unilateral variable area sound track and the uniformly illuminated light spot formed in its plane when the screen and opening of Fig. 3 are employed in the optical system of Figs. 1 and 2.

Fig. 5 is an enlarged elevation of a part of the optical system of Figs. 1 and 2, showing the light spot of vertically varying illumination formed therein in the plane of the positive film, and the variable density sound track produced on the positive film.

Fig. 6 is an enlarged elevation of the negative film having thereon the beginning of a unilateral variable area sound track and the uniformly illuminated light spot formed in its plane by means of the screen and opening of Fig. 3; certain relations between the transparent portion of the sound track and the light spot being indicated in a diagrammatic manner.

Fig. 7 is an enlarged elevation of a uniformly illuminated light spot embodying the invention and having such a shape that the exposure of the positive film is a second degree function of the width of the transparent portion of the variable area sound track.

Fig. 7A shows a modification of the uniformly illuminated light spot of Fig. 7.

Fig. 8 is an enlarged elevation of a uniformly illuminated light spot embodying the invention and having such a shape that said exposure is a third degree function of said width.

Fig. 8A shows a modification of the uniformly illuminated light spot of Fig. 8.

Fig. 9 is an enlarged elevation of the negative film having thereon the beginning of a unilateral variable area sound track and a uniformly illuminated light spot embodying the invention and being shaped so that the non-linear relationship between said width and said exposure is of such a character that the light transmission of the variable density sound track produced on the positive film is, after development thereof, linearly related to said width; certain relations between the transparent portion of the sound track and the light spot being indicated in a diagrammatic manner.

Figure 10:
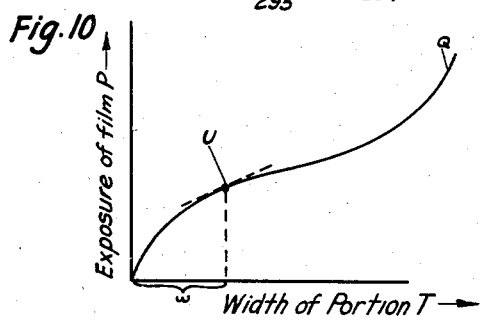

Fig. 10 shows a curve representing, in general, the relationship between said width and said exposure which results in a linear relationship between said width and said light transmission after the positive film has been developed.

Figure 11A:
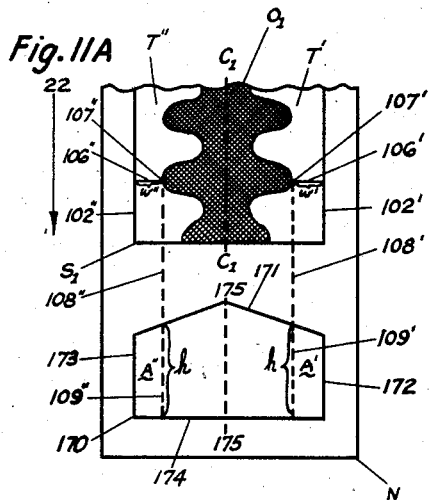

Fig. 11A is an enlarged elevation of the negative film having thereon the beginning of one type of a symmetrical variable area sound track and an adaptation for use with this type of sound track of the uniformly illuminated light spot of Fig. 7; certain relations between the transparent portion of the sound track and the light spot being indicated in a diagrammatic manner.

Figure 11B:
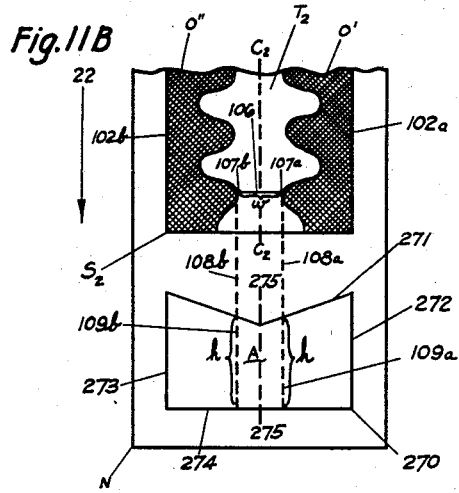

Fig. 11B is an enlarged elevation of the negative film having thereon the beginning of another type of symmetrical variable area sound track and an adaptation for use with this type of sound track of the uniformly illuminated light spot of Fig. 7; certain relations between the transparent portion of the sound track and the light spot being indicated in a diagrammatic manner.

Figure 12:
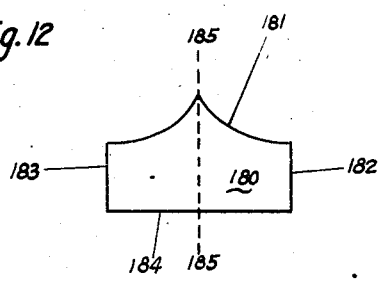

Fig. 12 shows an adaptation of the uniformly illuminated light spot of Fig. 8 for use with the two types of symmetrical variable area sound tracks shown in Figs. 11A and 11B, respectively.

Figure 13:
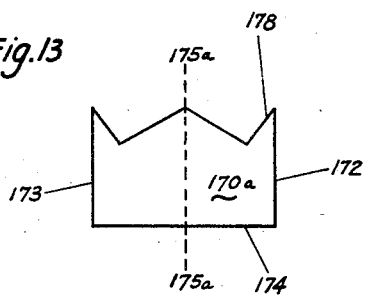

Fig. 13 shows an adaptation for the same purpose of the uniformly illuminated light spot of Fig. 7A.

Figure 14:
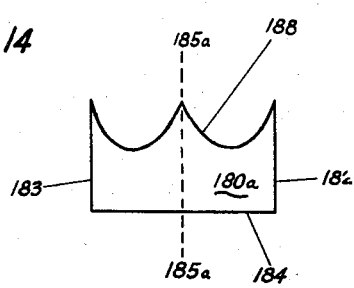

Fig. 14 shows an adaptation for the same purpose of the uniformly illuminated light spot of Fig. 8A.

Figure 15A:
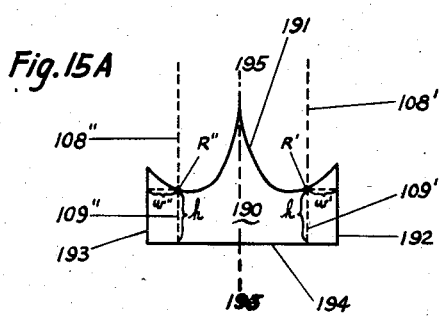

Fig. 15A shows an adaptation of the uniformly illuminated light spot of Fig. 9 for use with the type of symmetrical variable area sound track shown in Fig. 11A.

Figure 15B:
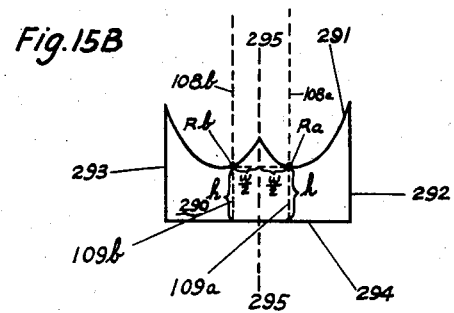

Fig. 15B shows a corresponding adaptation for use with the type of symmetrical variable area sound track shown in Fig. 11B.

Figure 16:
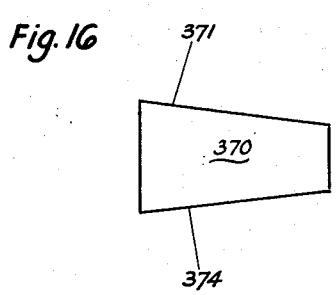

Fig. 16 shows another modification of the uniformly illuminated light spot of Fig. 7.

Figure 17:
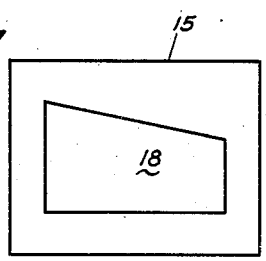

Fig. 17 is an enlarged elevation of the screen of Fig. 3 with an opening whose outline corresponds to the shape of the uniformly illuminated light spot of Fig. 7.

Figure 18:
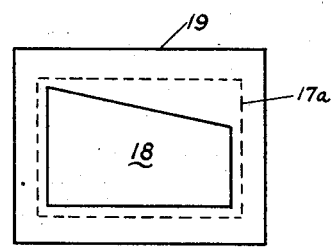

Fig. 18 is an elevation of an additional screen with an opening whose outline corresponds to the shape of the uniformly illuminated light spot of Fig. 7.

Figure 19:
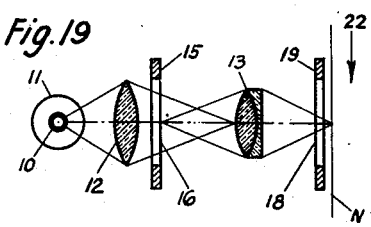

Fig. 19 is a diagrammatic longitudinal section of a part of the optical system of Figs. 1 and 2 showing how the screen of Fig. 18 may be placed therein.

In Figs. 1 and 2, there is shown by way of example one of the conversion sound printing optical systems disclosed in application Serial No. 449,798. Figs. 1 and 2 of this application are identical with Figs. 1 and 2 of application Serial No. 449,798, and Figs. 3 to 5 of this application which relate to certain parts of the optical system of Figs. 1 and 2, are identical with Figs. 3 to 5 of application Serial No. 449,798. Like parts are therefore designated by like reference characters in the two applications. Reference is made to the detailed explanation given in application Serial No. 449,798 of the manner in which the conversion, by printing, of a variable area sound track into a variable density sound track is effected in the optical system of Figs. 1 and 2. This explanation may be recapitulated for the purpose of this specification as follows:

As has already been pointed out hereinabove, the conversion effected in the optical system of Figs. 1 and 2 involves first the formation therein of a uniformly illuminated light spot in such a manner that it is more or less obscured when a negative film having the variable area sound track thereon moves vertically through a plane at right angles to the optical axis of the system. In the example illustrated, the uniformly illuminated light spot is light spot 17 (Fig. 4) which is formed in the plane of the negative film N by the conventional arrangement consisting of lamp filament 10, condenser lens 12, screen 15 with rectangular opening 16, and spherical lens 13 (Figs. 1 to 3). Light spot 17 is on the variable area sound track S when film N vertically moves through its plane, as indicated in Fig. 1 by the arrow 22, and hence is more or less obscured by the opaque portion of sound track S (Fig. 4).

Light spot 17 as obscured by the opaque portion of sound track S is imaged in the plane of the positive film P by the cylindrical lens 30 whose cylinder axis is horizontal, and which hence acts in only the vertical plane. Since, furthermore, cylindrical lens 30 is the only imaging means in the optical system of Figs. 1 and 2 having at its conjugate foci light spot 17 and the plane of film P, respectively, the light flux emanating from light spot 17 is treated differently in the two co-ordinate planes: In the vertical plane, the light flux is focused by cylindrical lens 30 at the plane of film P while, in the horizontal plane, it is permitted to diverge so that it is diffused at that position (Figs. 1 and 2).

More particularly, light spot 17 as obscured by the opaque portion of sound track S may be considered as being composed of a large number of horizontal levels whose illumination is uniform. These horizontal levels are equal in their very small vertical extension, or height, but vary in horizontal extension, or length, in accordance with the variation in width of the transparent portion of sound track S. The horizontal levels of light spot 17 are imaged in the plane of film P by the action of cylindrical lens 30 in the vertical plane, and thus a corresponding horizontal level is formed in the plane of film P for each of the horizontal levels of light spot 17. But, because of their divergence in the horizontal plane, the light fluxes contained in the individual horizontal levels of light spot 17 are diffused, that is, spread out, over about equal lengths in the plane of film P. The horizontal levels formed in the plane of film P therefore are of about equal length irrespective of the difference in length of the levels of light spot 17 to which they correspond. The amount of light flux, on the other hand, spread out over any one horizontal level in the plane of film P is substantially equal to the amount of light flux contained in the corresponding level of light spot 17. Those horizontal levels in the plane of film P which are images of the shorter levels of light spot 17 consequently have less illumination than those which are images of the longer ones.

The horizontal levels in the plane of film P thus constitute a light spot 31 of vertically varying illumination (Fig. 5). Light spot 31 is the image formed in the plane of film P by cylindrical lens 30 of light spot 17 as obscured by the opaque portion of sound track S, and the variation in illumination of light spot 31 is a linear function of the variation in width of the transparent portion of sound track S. The light flux emanating from light spot 31 effects the exposure of film P when film P moves vertically through its plane in the direction of the arrow 23, and thus there is produced on film P a sound track 38 which is of the variable density type but has otherwise the same characteristics as the variable area sound track S on film N (Fig. 5).

On the basis of the foregoing description of the imagery performed between the planes of films N and P, and with reference to Fig. 6 of this application, it shall now be explained in more detail how the exposure of film P is effected in the optical system of Figs. 1 and 2. In Fig. 6, there is again shown the negative film N having thereon the beginning of the variable area sound track S with its opaque portion O and its transparent portion T. The vertical edges 102 and 103 of sound track S constitute the straight boundaries of portions T and O, respectively, which portions are separated by the undulating boundary 105. Likewise on film N, and below sound track S, there is shown the uniformly illuminated rectangular light spot 17 which is formed in the plane of film N as explained hereinabove. The disposition of light spot 17 with respect to sound track S is such that its vertical edge 62 is in alignment with the straight boundary 102 of portion T, and its horizontal edge 64 parallel to horizontal edge 104 of sound track S. When, therefore, film N moves through its plane in the direction indicated by the arrow 22, light spot 17 is more or less obscured by portion O or, in other words, the amount of the light flux from lamp filament 10 transmitted by portion T towards cylindrical lens 30 and film P, is varied in accordance with the variation in width of portion T.

Portion T may be considered as being composed of a large number of transparent levels which are of very small and equal height but varying length, the length of any one transparent level being equal to the width of portion T at the position of the transparent level. The transparent levels extend horizontally between the straight boundary 102 of portion T and its undulating boundary 105, and thus are parallel to horizontal edge 104 of sound track S and horizontal edges 61 and 64 of light spot 17. One such transparent level is indicated, by way of example, at 106 in Fig. 6. Level 106 extends from a point on boundary 102 to a point 107 on boundary 105. As film N moves in the direction of the arrow 22, level 106 traverses light spot 17 from its horizontal edge 61 to its horizontal edge 64. Thus, level 106 sweeps out the portion A of light spot 17 between its vertical edge 62 and the broken vertical line 108 through point 107, thereby transmitting an amount of light flux which is a linear function of the area of portion A.

Let it now be assumed that, while film N moves in the direction of the arrow 22, film P moves in the direction of the arrow 23 (Fig. 1). According to well known laws of optics, a certain horizontal level 206 (not shown) on film P then is, in the vertical plane, conjugate to level 106 while level 106 traverses light spot 17. On account of the particular imagery performed in the optical system of Figs. 1 and 2 and explained hereinabove, the amount of light flux spread out over level 206 is, during any fraction of the time in which level 106 traverses light spot 17, substantially equal to the amount of light flux transmitted at this instant by level 106. The exposure of, that is, the total amount of light flux received by, film P at level 206 therefore is substantially equal to the amount of light flux transmitted by level 106 during the total time in which it traverses light spot 17. Since, as has been pointed out in the preceding paragraph, the amount of light flux transmitted by level 106 is a linear function of the area of portion A, the exposure of level 206 thus is likewise a linear function of the area of portion A.

While they have been made with reference to the rectangular light spot 17 shown in Figs. 4 and 6, the above explanations are valid for any shape the uniformly illuminated light spot in the plane of film N may assume. In the case of rectangular light spot 17, however, these further considerations apply:

Portion A is defined by vertical edge 62 of light spot 17 and by the section 109 of vertical line 108 which is within light spot 17. Portion A is further defined by the sections 65 and 66 of horizontal edges 61 and 64, respectively, of light spot 17, which sections are between edge 62 and line 108. Since light spot 17 is a rectangle, edges 61 and 64 both are perpendicular to edge 62 and hence parallel to one another. Since, furthermore, edges 61 and 64 are parallel to horizontal edge 104 of sound track S, vertical line 108 is perpendicular to edges 61 and 64. Portion A thus is a rectangle whose one side is of the length $w$ of level 106, while its other side is of the length $h$ of section 109, and whose area hence is a function of the product $w \times h$. Moreover, on account of the rectangular shape of light spot 17 its height, that is, the distance of horizontal edges 61 and 64 from one another, is constant at all points thereon. For that reason, the value of $h$ remains constant no matter at what distance from vertical edge 102 of sound track S, and vertical edge 62 of light spot 17, vertical line 108 is drawn through point 107, the distance of line 108 from edge 102 being, of course, equal to the length $w$ of level 106. In the case of rectangular light spot 17, therefore, the factor $w$ is the only variable of the two factors to whose product the area of portion A is related. Hence, the area of portion A is in this case a linear function of $w$ and, since it is such a function, the exposure of level 206 is, for the reasons set forth hereinabove, also a linear function of $w$.

Let it now be assumed that, in place of the uniformly illuminated rectangular light spot 17, there is formed in the plane of film N a uniformly illuminated light spot X (not shown), and that the shape of light spot X is defined so that light spot X has two horizontal edges and that its height, that is, the distance of its horizontal edges from one another, varies. The length $h$ of the section 109 of line 108 which is within light spot X, then varies in the same manner as the height of light spot X, and in relation to the variation of the length $w$ of level 106. In the case of light spot X, therefore, the area of portion A is no longer a function of the product of a variable and a constant, but it is a function of the product of two variables. Furthermore, since the one of these variables, namely, $h$, is a function of the other variable, namely, $w$, the area of portion A is, in the case of light spot X, a non-linear function of $w$. Finally, since with any shape of the uniformly illuminated light spot in the plane of film N the exposure of level 206 is a linear function of the area of portion A, it is, in the case of light spot X, a non-linear function of $w$. It will thus be seen that, by defining the height of light spot X so that it varies in an appropriate manner, any desired non-linear relationship may be established between the exposure of level 206 and the length of level 106. It is understood that the establishment of such a non-linear relationship in the optical system of Figs. 1 and 2 will generally result in distortions of the variable density sound track 38 produced on film P by printing. But this result is at times desirable, for example, to compensate for distortions arising from other sources, as will be explained hereinafter.

A simple non-linear relationship between the exposure of level 206 and the length of level 106 may be established, for example, by forming, in the plane of film N the uniformly illuminated light spot 70 shown in Fig. 7. Light spot 70 has a straight edge 71 which extends slantwise in a horizontal direction so as to be inclined with respect to vertical edges 72 and 73 of light spot 70 and to point upward from edge 72 to edge 73. Horizontal edge 74, on the other hand, of light spot 70 is not only straight but also perpendicular to vertical edges 72 and 73.

With this shape of light spot 70, the distance of its horizontal edge 71 from its horizontal edge 74 varies in such a manner that it increases from its vertical edge 72 to its vertical edge 73. Consequently, the length $h$ of the section 109 of vertical line 108 which is within light spot 70, increases with the distance of point 107 from the vertical edge 102 of sound track S, that is, with the increase of the length $w$ of level 106. Since inclined edge 71 is straight, the increase of $h$ is a linear function of the increase of $w$. In the case of light spot 70, therefore, the two factors $w$ and $h$ to whose product the area of portion A is related, are variable, and they are interdependent in such a manner that $h$ is a linear function of $w$. Hence, the area of portion A is in this case a second degree function of $w$, and so is the exposure of level 206.

It should be noted that, since inclined edge 71 points upward from vertical edge 72 to vertical edge 73, $h$ increases when $w$ increases so that the rate of change of the area of portion A increases when $w$ increases. When, therefore, light spot 70 is bounded by a straight and inclined edge which points downward from vertical edge 72 to vertical edge 73, the area of portion A is again a second degree function of $w$. But $h$ now decreases when $w$ increases so that the rate of change of the area of portion A now decreases when $w$ increases.

In Fig. 8 there is shown another example of a uniformly illuminated light spot the formation of which in the plane of film N will establish a non-linear relationship between the exposure of level 206 and the length of level 106. Light spot 80 has a curved edge 81 whose curvature is of a parabolic character. Curved edge 81 extends horizontally from vertical edge 82 of light spot 80 to vertical edge 83 thereof in such a manner that its slope increases as it approaches edge 83. Horizontal edge 84, on the other hand, of light spot 80 is not only straight but also perpendicular to vertical edges 82 and 83.

With this shape of light spot 80, the distance of its horizontal edge 81 from its horizontal edge 84 again varies in such a manner that it increases from its vertical edge 82 to its vertical edge 83. Consequently, the length $h$ of the section 109 of vertical line 108 which is within light spot 80, again increases with the distance of point 107 from the vertical edge 102 of sound track S, that is, with the increase of the length $w$ of level 106. Since, however, curved edge 81 is a parabola, the increase of $h$ now is a second degree function of the increase of $w$. In the case of light spot 80, therefore, the two factors $w$ and $h$ to whose product the area of portion A is related, are interdependent in such a manner that $h$ is a second degree function of $w$. Hence, the area of portion A is in this case a third degree function of $w$, and so is the exposure of level 206.

It should be noted that, since the slope of parabolic edge 81 increases as it approaches vertical edge 83, $h$ increases when $w$ increases so that the rate of change of the area of portion A increases when $w$ increases. When, therefore, light spot 80 is bounded by a parabolic edge whose slope decreases as it approaches vertical edge 83, the area of portion A is again a third degree function of $w$. But $h$ now decreases when $w$ increases so that the rate of change of the area of portion A now decreases when $w$ increases.

When the uniformly illuminated light spots 70 and 80 are shaped as illustrated in Figs. 7 and 8, $h$ increases with $w$ over the entire horizontal extension, or width, of these light spots. But the uniformly illuminated light spot in the plane of film N may also be shaped so that $h$ increases with $w$ over one part of its width, and decreases when $w$ increases over another part of its width. A uniformly illuminated light spot of a shape resulting in a functional relationship of this kind is light spot 70a shown in Fig. 7A as bounded by inclined edge 78. Another example of this type of light spot is light spot 80a shown in Fig. 8A. Light spot 80a is bounded by curved edge 88, and the curvature of edge 88 is of a parabolic character. When, therefore, in the case of uniformly illuminated light spots 70a and 80a $w$ increases, the rate of change of the area of portion A increases over one part of their width and decreases over another part thereof.

Throughout the foregoing description of Figs. 7, 7A, 8, and 8A, it has been assumed that light spots 70, 70a, 80, and 80a are so positioned in the plane of film N that their vertical edges 72 and 82, respectively, are in alignment with straight boundary 102 of portion T, and their horizontal edges 74 and 84 parallel to horizontal edge 104 of sound track S. The disposition, with respect to edges 102 and 104, of edges 72 and 74, and 82 and 84, respectively, therefore is the same as that of edges 62 and 64 of light spot 17 as illustrated in Fig. 6. If the relative positions of sound track S and light spots 70, 70a, 80, and 80a, were reversed so that the straight boundary 103 of portion O were in alignment with edges 72 and 82, respectively, the functional relationships between $w$ and $h$ would be reversed as far as the increase or decrease of $h$ in accordance with the increase of $w$ is concerned.

Light spots 70 and 70a (Figs. 7 and 7A) are horizontally bounded by perpendicular and straight edge 74 and by inclined edges 71 and 78, respectively, and light spots 80 and 80a (Figs. 8 and 8A) are horizontally bounded by perpendicular and straight edge 84 and by curved edges 81 and 88, respectively. Since inclined edges 71 and 78 are straight throughout their entire lengths, the functional relationship between $w$ and $h$ is of a linear character over the entire width of light spots 70 and 70a. Similarly, since the curvature of edges 81 and 88 is parabolic throughout their entire lengths, the functional relationship between $w$ and $h$ is of a second degree character over the entire width of light spots 80 and 80a. The functional relationship, therefore, between $w$ and the area of portion A is of a second degree character over the entire width of light spots 70 and 70a, and of a third degree character over the entire width of light spots 80 and 80a.

But, in addition to being bounded by a perpendicular and straight horizontal edge, the uniformly illuminated light spot X may also be bounded by a horizontal edge whose contour is in part inclined and straight and in part parabolic so that the functional relationship between $w$ and $h$ is of a linear character over one part of the width of the light spot, and of a second degree character over another part of its width. Moreover, any other complex character may be given to this functional relationship by appropriately defining the contour of one of the two horizontal edges, and hence of the height, of the uniformly illuminated light spot X. As will readily be understood from the foregoing explanations, it is the character of the functional relationship between $w$ and $h$ which in any case determines the character of the functional relationship between $w$ and the area of portion A, and hence the exposure of film P at level 206. The exposure of level 206, therefore, may be brought into any desired functional relationship to $w$ by so defining the height of the uniformly illuminated light spot X that it varies in a manner establishing the appropriate determining functional relationship between $w$ and $h$. This principle is applied in a presently preferred embodiment of the invention as follows:

As is well known in the art, the light transmission of a developed film is not linearly related to its exposure. The variations in light transmission of the variable density sound track 38 after the positive film P has been developed, thus are not linearly related to the variations in amount of the light flux from lamp filament 10 which was, in the optical system of Figs. 1 and 2, transmitted to film P by the transparent portion T of the variable area sound track S. If, for example, the amount of light flux transmitted by portion T was linearly related to the width of portion T because the uniformly illuminated rectangular light spot 17 was formed in the plane of film N (Figs. 4 and 6), the light transmission of the developed sound track 38 is not linearly related to the width of portion T. Hence, sound track 38 is in this case not directly usable for the reproduction of undistorted sound. If, therefore, it is desired to reproduce undistorted sound directly from sound track 38, there must be established, in the optical system of Figs. 1 and 2, a non-linear relationship between the width of portion T and the exposure of film P so as to compensate for the non-linearity of the emulsion characteristic of film P. In this manner, a linear relationship is established between the width of portion T and the light transmission of sound track 38 after development of film P, which condition allows for the reproduction of undistorted sound directly from sound track 38.

It must now be remembered that, according to the present invention, any desired relationship between the exposure of film P at horizontal level 206 and the length $w$ of the conjugate level 106 of portion T may be established, in the optical system of Figs. 1 and 2, by so defining the height of the uniformly illuminated light spot X that it varies in a manner establishing the appropriate determining functional relationship between $w$ and the length $h$ of the section 109 of the vertical line 108 which is within the light spot. The compensating non-linear relationship described in the preceding paragraph, therefore, is established in the optical system of Figs. 1 and 2 by so defining the contour of one of the two horizontal edges of a light spot embodying the uniformly illuminated light spot X, for example, of the horizontal edge 91 of the light spot 90 shown in Fig. 9, that the height of light spot 90 varies in the proper manner. Curved edge 91 extends horizontally between the vertical edges 92 and 93 of light spot 90, while the horizontal edge 94 of light spot 90 is straight and perpendicular to vertical edges 92 and 93. The distance of horizontal edges 91 and 94 from one another, that is, the height of light spot 90, therefore varies in the manner indicated by the contour of edge 91. The disposition, finally, of light spot 90 with respect to sound track S is such that its vertical edge 92 is in alignment with the straight boundary 102 of portion T and its horizontal edge 94 parallel to horizontal edge 104 of sound track S.

The exact contour of curved edge 91 is determined by first determining that relationship between $w$ and the exposure of level 206 which results in a linear relationship between $w$ and the light transmission of level 206 after film P has been developed. This relationship between $w$ and the exposure of level 206 can be determined experimentally for any kind of film stock which it is desired to use as film P. The actual values found by experiment will differ for different kinds of film stock in accordance with their different emulsion characteristics, and for the same kind of film stock in accordance with its processing, but the resulting curve will in each case be of the general character represented by the curve Q in Fig. 10.

Referring again to Fig. 9, curved edge 91 of light spot 90 is intersected at point R by the vertical line 108 through the endpoint 107 of level 106. The distance of point R from vertical edge 92 is, on account of the geometrical relationships shown in the drawings and described hereinabove, equal to the length $w$ of level 106, while the distance of point R from horizontal edge 94, that is, the height of light spot 90, is equal to the length $h$ of the section 109 of line 108 which is within light spot 90. Edge 91 now is curved so that $h$ is linearly related to the slope of curve Q at the point U thereon whose abscissa is $w$. With this contour of edge 91 there is then established the desired determining relationship between $w$ and $h$. Furthermore, according to a well known principle of mathematics, curve Q will result when the area of the portion of light spot 90 between vertical edge 92 and vertical line 108, that is, the area of portion A swept out by level 106 when it traverses light spot 90, is plotted against the distance of point R from edge 92, that is, the length $w$ of level 106. The area of portion A, therefore, is in the case of light spot 90 a non-linear function of $w$, the non-linearity being of the character represented by curve Q. Since the exposure of level 206 is, in the optical system of Figs. 1 and 2, linearly related to the area of portion A, curve Q also represents the character of the non-linear relationship between $w$ and the exposure of level 206 when the uniformly illuminated light spot 90 is formed in the plane of film N. This character is, on account of the manner in which curve Q was derived, such that the light transmission of level 206 is a linear function of $w$ after film P has been developed; provided, of course, that the above mentioned linear relationship between $h$ and the slope of curve Q is such that, under the conditions of the actual printing operation, the exposure of level 206 falls along curve Q and not along a curve parallel thereto.

It will thus be seen that, with the uniformly illuminated light spot 90 formed in the plane of film N of the optical system of Figs. 1 and 2, a linear relationship is established between the width of the transparent portion T of the variable area sound track S and the light transmission of the variable density sound track 38 after the positive film P has been developed. As has been pointed out hereinabove, this result is desirable if undistorted sound is to be reproduced directly from sound track 38. However, the present invention may also be used to establish any desired non-linear relationship between the width of portion T and the light transmission of the developed sound track 38. Such a non-linear relationship is desirable, for example, if the developed sound track 38 is to be printed from film P onto a film F (not shown) by means of either the optical system of Figs. 1 and 2 or a conventional sound printing optical system. In order to make possible the reproduction of sound from the variable density sound track thus produced on film F without causing distortion due to the non-linearity of the emulsion characteristics of film P and film F, the light transmission of the developed sound track on film F must be a linear function of the width of portion T. This condition is satisfied when a non-linear relationship is established between the width of portion T and the light transmission of the developed sound track 38 so as to compensate for the non-linearity of the emulsion characteristics of film P and film F. According to the present invention, a non-linear relationship of such a character is established again by appropriately defining, in the optical system of Figs. 1 and 2, the height of a light spot embodying the uniformly illuminated light spot X, and this is done again by suitably defining the contour of one of the two horizontal edges of the light spot. The exact contour of this curved edge is determined by first determining experimentally the curve representing that relationship between the width of portion T and the exposure of film P which results in a non-linear relationship between the width of portion T and the light transmission of the developed sound track 38 of such a character that a linear relationship is established between the width of portion T and the light transmission of the developed sound track on film F. By means of this curve, the horizontal edge then is curved so as to make $w$ and $h$ interdependent in such a manner that $h$ is linearly related to the slope of the curve at a point thereon whose abscissa is $w$. As in the case of curved edge 91, $h$ is the distance of a point on the curved edge from the straight horizontal edge of the light spot, that is, the height of the light spot, while $w$ is the distance of this point from that vertical edge of the light spot which is to be in alignment with the straight boundary 102 of portion T. Since, furthermore, the contours of the curve and the curved edge now under discussion are, in general, similar to the contours of curved edge 91 and curve Q, reference is made to Figs. 9 and 10 by way of further explanation. As a result of its being bounded by a curved horizontal edge of the contour described hereinabove, the formation of the uniformly illuminated light spot in the plane of film N brings about that the light transmission of the developed sound track 38 has such a non-linear relationship to the width of portion T that the light transmission of the developed variable density sound track on film F will be a linear function thereof. It is understood that, in order properly to achieve this end, the above mentioned linear relationship between $h$ and the slope of the curve must be such that, under the conditions of the actual printing operation, the exposure of film P falls along the aforementioned curve and not along a curve parallel thereto.

According to the present invention, there can thus be established in the optical system of Figs. 1 and 2 non-linear relationships between the width of the transparent portion T of the variable area sound track S and the exposure of the positive film P, whose character is such that linear relationships are established between the width of portion T and the light transmission of the developed variable density sound track on either film P or film F. This result is achieved in both cases without imposing restrictions, on account of their emulsion characteristics, on the choice of the film stocks which are usable as film P and film F, respectively, and without necessitating a reduction of the volume range of the reproduced sound by the mode of employment of those film stocks.

Throughout the foregoing description of the present invention it has been assumed that the variable area sound track S on film N is of the unilateral type as illustrated in Figs. 4, 6 and 9. However, as has been pointed out in application Serial No. 449,798, the variable area sound track on film N which is to be converted into the variable density sound track 38 on film P by means of the printing optical system of Figs. 1 and 2, may also be of the bilateral, or symmetrical, type, and in this case, too, there may be employed the invention disclosed and claimed in this specification. The symmetrical variable area sound track on film N may, for example, be an original negative which has its transparent portion divided by its opaque portion $O_1$ into two portions T' and T'' as has sound track $S_1$ shown in Fig. 11A. As likewise shown in Fig. 11A, sound track $S_1$ is symmetrical about its vertical center line $C_1$—$C_1$. Consequently, any light spot formed in the plane of film N as an embodiment of the uniformly illuminated light spot X must be symmetrical about its vertical center line as is light spot 170 shown in Fig. 11A as an example of such a light spot. On account of its symmetry, the shape of light spot X in the cases now under discussion therefore is such that its height varies in the same sense on both sides of its vertical center line. Moreover, the vertical center line of the light spot embodying the uniformly illuminated light spot X must be in alignment with the center line $C_1$—$C_1$ of sound track $S_1$ as is the vertical center line 175—175 of light spot 170.

On account of the division into the two portions T' and T'' of the transparent portion of sound track $S_1$ by its opaque portion $O_1$, the transparent levels constituting it are divided into two sections. One of these sections is on portion T' of sound track $S_1$ and the other on its portion T'', as indicated in Fig. 11A at 106' and 106''. Since sound track $S_1$ is symmetrical about its center line $C_1$—$C_1$, its portions T' and T'' are symmetrically disposed with respect to center line $C_1$—$C_1$, and so are sections 106' and 106''. The length $w'$ of section 106' thus is equal to the length $w''$ of section 106'', and the total length $w$ of the transparent level consisting of sections 106' and 106'' is equal to the sum of $w'$ and $w''$.

Sections 106' and 106'' have end points 107' and 107'', respectively, on the undulating boundaries between portion $O_1$ and portions T' and T'', respectively, and broken vertical lines 108' and 108'' are drawn through points 107' and 107'', respectively. It has been explained hereinbefore that, when employed with sound track $S_1$, any light spot formed in the plane of film N as an embodiment of the uniformly illuminated light spot X is symmetrical about its vertical center line and, furthermore, that this center line is in alignment with the center line $C_1$—$C_1$ of sound track $S_1$. For that reason, and because sections 106' and 106'' are symmetrically disposed with respect to center line $C_1$—$C_1$, $h$ is the length of both the sections 109' and 109'' of vertical lines 108' and 108'' within any such light spot. There are swept out, therefore, by the transparent level consisting of the two sections 106' and 106'' the two portions A' and A'' of the light spot embodying light spot X, which portions are symmetrically disposed with respect to the vertical center line of this light spot. But the total area of portions A' and A'' is again a function of the product $w \times h$, and a non-linear function of $w$.

For example, in order to make the total area of portions A' and A'' a second degree function of $w$, the uniformly illuminated light spot 170, shown in Fig. 11A, is formed in the plane of film N. Light spot 170 has a V-shaped edge 171 which extends horizontally so as to be inclined with respect to vertical edges 172 and 173 of light spot 170. The apex of edge 171 is on center line 175—175 of light spot 170, and the straight legs of edge 171 both point upward from edges 172 and 173. Horizontal edge 174, on the other hand, of light spot 170 is not only straight but also perpendicular to vertical edges 172 and 173. Light spot 170 is symmetrical about its center line 175—175 so that the distance of horizontal edge 171 from horizontal edge 174 decreases on both sides thereof, and center line 175—175 is in alignment with center line $C_1$—$C_1$ of sound track $S_1$.

Referring now to the explanations given hereinabove in connection with Fig. 7, it will readily be understood that with light spot 170 bounded by edge 171 the total area of portion A' and A'' swept out by the transparent level consisting of sections 106' and 106'', and hence the exposure of film P at level 206, is a second degree function of the total length $w$ of that level. Furthermore, since the straight legs of V-shaped edge 171 both point upward from vertical edges 172 and 173, $h$ increases when $w$ increases so that the rate of change of the exposure of level 206 increases with the increase of $w$. When, therefore, light spot 170 is bounded by a V-shaped edge whose straight legs both point downward from vertical edges 172 and 173, the total area of portions A' and A'' swept out by the transparent level consisting of sections 106' and 106'' is again a second degree function of the total length $w$ of that level. But $h$ now decreases when $w$ increases so that the rate of change of the exposure of level 206 decreases with the increase of $w$. The same result, therefore, is obtained with light spot 170 when symmetrical track $S_1$ is on film N, as with light spot 70 when unilateral track S is on film N.

It should be noted that, in the same manner as it is conjugate to the level 106 on portion T of unilateral sound track S, level 206 on film P is, in the optical system of Figs. 1 and 2, conjugate to the level consisting of sections 106' and 106'' on portions T' and T'' of symmetrical sound track S₁. Furthermore, although this level is divided into two sections, the conjugate level 206 on film P is undivided for the reasons set forth in application Serial No. 449,798.

Another type of symmetrical variable area sound track is sound track S₂ shown in Fig. 11B. Sound track S₂, which may have been obtained by printing from a sound track such as sound track S₁ or directly recorded by means of the reversal method, has its opaque portion divided by its transparent portion T₂ into two portions O' and O''. As shown in Fig. 11B, sound track S₂ is symmetrical about its vertical center line C₂—C₂. As with sound track S₁, therefore, any light spot employed with sound track S₂ as an embodiment of the uniformly illuminated light spot X, must be symmetrical about its vertical center line as is light spot 270 shown in Fig. 11B as an example of such a light spot. Also like with sound track S₁, the center line of the light spot employed with sound track S₂ and embodying light spot X must be in alignment with center line C₂—C₂ of sound track S₂, as is the vertical center line 275—275 of light spot 270.

However, in contradistinction to the transparent portion of sound track S₁, portion T₂ of sound track S₂ is composed of undivided transparent levels. One such level is indicated at 106 in Fig. 11B. Level 106 is symmetrical about center line C₂—C₂ with its endpoints 107a and 107b on the undulating boundaries between portion T₂ and portions O' and O'', respectively, and broken vertical lines 108a and 108b are drawn through points 107a and 107b, respectively. A single portion A, therefore, of the light spot embodying the uniformly illuminated light spot X is swept out by the undivided level 106, and portion A is symmetrical about the vertical center line of this light spot. The area of portion A thus is again a function of the product $w \times h$ and a non-linear function of $w$, $w$ being the length of level 106 and $h$ the length of the sections 109a and 109b of vertical lines 108a and 108b which are within the light spot embodying light spot X. Sections 109a and 109b are of equal length because level 106 is symmetrical about center line C₂—C₂, the light spot embodying light spot X is symmetrical about its own center line, and the two center lines are in alignment with one another.

For example, in order to make the area of portion A a second degree function of $w$, the uniformly illuminated light spot 270, shown in Fig. 11B, is formed in the plane of film N. Light spot 270 has a V-shaped edge 271 which extends horizontally so as to be inclined with respect to vertical edges 272 and 273 of light spot 270. The apex of edge 271 is on center line 275—275 of light spot 270, and the straight legs of edge 271 both point downward from edges 272 and 273. Horizontal edge 274, on the other hand, of light spot 270 is not only straight but also perpendicular to vertical edges 272 and 273. Light spot 270 is symmetrical about its center line 275—275 so that the distance of horizontal edge 271 from horizontal edge 274 increases on both sides thereof, and center line 275—275 is in alignment with the center line C₂—C₂ of sound track S₂.

In view of the explanations given hereinabove in connection with Figs. 7 and 11A, it will readily be understood that with light spot 270 bounded by edge 271 the area of portion A swept out by the undivided level 106 of portion T₂, and hence the exposure of film P at level 206, is a second degree function of the length $w$ of that level. Furthermore, since the straight legs of V-shaped edge 271 both point downward from vertical edges 272 and 273, $h$ increases when $w$ increases so that the rate of change of the exposure of level 206 increases with the increase of $w$. When, therefore, light spot 270 is bounded by a V-shaped edge whose straight legs both point upward from vertical edges 272 and 273, the area of portion A swept out by the undivided level 106 of portion T₂ is again a second degree function of the length $w$ of that level. But $h$ now decreases when $w$ increases so that the rate of change of the exposure of level 206 decreases with the increase of $w$. The same result, therefore, is obtained with light spot 270 when symmetrical track S₂ is on film N, as with light spot 170 when symmetrical track S₁ is on film N. As a matter of fact, when light spot 170 is bounded by a V-shaped edge whose legs both point downward from vertical edges 172 and 173, it is identical with light spot 270 and, conversely, when light spot 270 is bounded by a V-shaped edge whose legs both point upward from vertical edges 272 and 273, it is identical with light spot 170.

Uniformly illuminated light spots 170 and 270 thus are adaptations of light spot 70 for use with the symmetrical variable area sound tracks S₁ and S₂, respectively. In like manner, the uniformly illuminated light spots 180, 170a, and 180a, shown in Figs. 12, 13, and 14, respectively, are adaptations for the same purpose of light spots 80, 70a, and 80a, respectively. For example, light spot 180 may be bounded horizontally by straight edge 184 and curved edge 181 whose curvature is of a parabolic character and whose distance from horizontal edge 184 decreases on both sides of the center line 185—185 of light spot 180. The employment, therefore, of light spot 180 in conjunction with either track S₁ or track S₂ results in the exposure of level 206 being a third degree function of $w$. But the rate of change of the exposure increases with $w$ when light spot 180 is employed with track S₁, while it decreases with the increase of $w$ when light spot 180 is employed with track S₂. Similar considerations apply in the case of light spot 170a which is bounded by inclined edge 178, and of light spot 180a which is bounded by parabolic edge 188. In accordance with the explanations made hereinabove, light spots 180, 170a, and 180a, are symmetrical about their vertical center lines 185—185, 175a—175a, and 185a—185a, respectively, and, when these light spots are formed in the plane of film N, their vertical center lines are in alignment with the center lines C₁—C₁ and C₂—C₂ of tracks S₁ and S₂, respectively, in the manner illustrated in Figs. 11A and 11B for the vertical center lines 175—175 and 275—275 of light spots 170 and 270, respectively.

Finally, the uniformly illuminated light spots 190 and 290 shown in Figs. 15A and 15B, respectively, are adaptations of light spot 90 for use with the symmetrical variable area sound tracks S₁ and S₂, respectively. Light spot 190, which is to be used in conjunction with track S₁, is bounded by the curved edge 191 which extends horizontally between the vertical edges 192 and 193 of light spot 190, while the horizontal edge 194 of light spot 190 is straight and perpendicular to vertical edges 192 and 193. The distance of horizontal edges 191 and 194 from one another, that is, the height of light spot 190, therefore varies in the manner indicated by the contour of edge 191.

Light spot 190 is symmetrical about its vertical center line 195—195 and, when light spot 190 is formed in the plane of film N, center line 195—195 is in alignment with center line $C_1$—$C_1$ of track $S_1$, while vertical edges 192 and 193 are in alignment with the straight boundaries 102' and 102" of portions T' and T", respectively. Furthermore, edge 191 is intersected at the points R' and R" by the vertical lines 108' and 108" through the endpoints 107' and 107" of sections 106' and 106", respectively. On account of the geometrical relationships involved in this case, the distance of point R' from vertical edge 192 is equal to the length $w'$ of section 106', and the distance of point R" from vertical edge 193 is equal to the length $w''$ of section 106"—$w'$ and $w''$ being equal as has been pointed out hereinabove—while the distance of points R' and R" from horizontal edge 194, that is, the height of light spot 190, is equal to the length $h$ of the sections 109' and 109" of lines 108' and 108", respectively, which are within light spot 190; compare Figs. 15A and 11A.

The exact contour of curved edge 191 is determined essentially in the manner described hereinabove in connection with Figs. 9 and 10 for the curved edge 91 of light spot 90. That is to say, after curve Q has been determined by experiment, horizontal edge 191 is curved so that $h$ is linearly related to the slope of curve Q at the point U thereon when $w'$ and $w''$, respectively, are equal to half the abscissa of point U. Curved edge 191 then is so disposed with respect to center line 195—195 that the length thereof is equal to the value of $h$ for the maximum value of the total length $w$ of the transparent level consisting of sections 106' and 106", that is, of the width of portions T' and T".

Light spot 290 which is to be used in conjunction with track $S_2$, on the other hand, is bounded by the curved edge 291 which extends horizontally between the vertical edges 292 and 293 of light spot 290, while the horizontal edge 294 of light spot 290 is straight and perpendicular to vertical edges 292 and 293. The distance of horizontal edges 291 and 294 from one another, that is, the height of light spot 290, therefore varies in the manner indicated by the contour of edge 291.

Light spot 290 is symmetrical about its vertical center line 295—295 and, when light spot 290 is formed in the plane of film N, center line 295—295 is in alignment with center line $C_2$—$C_2$ of track $S_2$, while vertical edges 292 and 293 are in alignment with the straight boundaries 102a and 102b of portions O' and O", respectively. Furthermore, curved edge 291 is intersected at the points $Ra$ and $Rb$ by the vertical lines 108a and 108b through the endpoints 107a and 107b, respectively, of level 106. On account of the geometrical relationships involved in this case, the distance $w/2$ of points $Ra$ and $Rb$ from center line 295—295 is equal to half the length $w$ of level 106, while their distance from horizontal edge 294, that is, the height of light spot 290, is equal to the length $h$ of the sections 109a and 109b of lines 108a and 108b, respectively, which are within light spot 290; compare Figs. 15B and 11B.

The exact contour of curved edge 291 is determined essentially in the manner described hereinabove in connection with Figs. 9 and 10 for curved edge 91 of light spot 90. That is to say, after curve Q has been determined by experiment, horizontal edge 291 is curved so that $h$ is linearly related to the slope of curve Q at the point U thereon when $w/2$ is equal to half the abscissa of point U. Curved edge 291 then is so disposed with respect to center line 295—295 that the length thereof is equal to the value of $h$ for the zero value of the length $w$ of level 106, that is, of the width of portion $T_2$.

Thus, when the uniformly illuminated light spot 190 is employed in conjunction with the symmetrical variable area sound track $S_1$, and the uniformly illuminated light spot 290 in conjunction with the symmetrical variable area sound track $S_2$, there is established a non-linear relationship between $w$ and the exposure of level 206 whose character is such that the light transmission of level 206 is a linear function of $w$ after film P has been developed; provided, of course, that the above mentioned linear relationship between $h$ and the slope of curve Q is such that, under the conditions of the actual printing operation, the exposure of level 206 falls along curve Q and not along a curve parallel thereto.

However, by employing in conjunction with the symmetrical variable area sound tracks $S_1$ and $S_2$ uniformly illuminated light spots which are symmetrical about their respective vertical center lines, and which are bounded horizontally by curved edges of appropriate contours, the light transmission of level 206 may also be made a non-linear function of $w$ after film P has been developed. The non-linear relationship between the width of portions T' and T", or portion $T_2$, and the light transmission of the developed variable density sound track 38 may, for example, be of such a character that, when sound track 38 is printed from film P onto a film F (not shown), the light transmission of the variable density sound track thus produced on film F is, after development of film F, linearly related to the width of portions T' and T", or portion $T_2$. In order actually to establish a non-linear relationship of this character, one of the two horizontal edges of the uniformly illuminated light spots may be curved essentially in the manner explained hereinabove with reference to the establishment of a relationship of the same character in case that unilateral sound track S is on film N. First, there is determined experimentally the curve representing that relationship between the width of portions T' and T", or portion $T_2$, and the exposure of film P which results in the desired non-linear relationship between that width and the light transmission of the developed sound track 38. Next, the horizontal edges are curved so that a linear relationship is established between $h$ and the slope of the curve at a point thereon, $h$ being the distance of two points on the curved edge from the straight horizontal edge of the light spot, that is, the height of the light spot. The distance of the one of these two points from the one vertical edge of the light spot, and the distance of the other point from the other vertical edge of the light spot, are in the case of the light spot which is to be used in conjunction with track $S_1$ both equal to half the abscissa of the point on the curve. The curved horizontal edge, therefore, is in this case so disposed with respect to the vertical center line of the light spot that the length thereof is equal to the value of $h$ for the maximum value of the width of portions T' and T".

In the case of the light spot which is to be used in conjunction with track $S_2$, on the other hand, the distance of the two points on the curved edge from the vertical center line of the light spot is made equal to half the abscissa of the point on the curve. This curved horizontal edge, therefore, is so disposed with respect to the vertical center line of the light spot that the length thereof is equal to the value of $h$ for the zero value of the width of portion $T_2$.

Since the two last mentioned light spots are, in general, similar to light spots 190 and 290, reference is made to Figs. 15A and 15B by way of further explanation. Furthermore, it is understood that, when these two light spots are formed in the plane of film N, their vertical center lines are in alignment with center lines $C_1$—$C_1$ and $C_2$—$C_2$ of tracks $S_1$ and $S_2$, respectively, and that, in order properly to establish the non-linear relationship characterized in the last but preceding paragraph, the above mentioned linear relationship between $h$ and the slope of the curve must be such that, under the conditions of the actual printing operation, the exposure of film P falls along the aforementioned curve and not along a curve parallel thereto.

Horizontal edges 74, 84, 94, 174, 274, 184, 194, and 294, are shown in Figs. 7 to 9 and 11A to 15B, and have been described hereinabove, as being straight and perpendicular to the two vertical edges of light spots 70 and 70a, 80 and 80a, 90, 170 and 170a, 270, 180 and 180a, 190, and 290, respectively. Any desired determining relationship between $w$ and $h$, however, may also be established by defining the shape of the uniformly illuminated light spot X so that neither of its two horizontal edges is straight and/or perpendicular to its two vertical edges. The only requirements that must be fulfilled in any such case are that the distance from one another of the horizontal edges, that is, the height, of the light spot varies and that, when employed with symmetrical variable area sound tracks such as sound tracks $S_1$ and $S_2$, the light spot is symmetrical about its vertical center line. Furthermore, the law governing the variation of the height of this light spot must result in the desired functional relationship between $w$ and $h$. The uniformly illuminated light spot 370 shown in Fig. 16, for example, which is bounded by the two inclined horizontal edges 371 and 374, may readily be substituted for light spot 70 when the latter light spot is bounded by inclined edge 71 and perpendicular edge 74.

Light spots 70, 70a, 80, 80a, 90, 170, 270, 170a, 180, 180a, 190, 290, and 370, have been shown in Figs. 7 to 9 and 11A to 16 and described hereinabove by way of example as embodiments of the uniformly illuminated light spot X whose shape is defined so that it has two horizontal edges and that its height, that is, the distance of its horizontal edges from one another, varies. In the optical system of Figs. 1 and 2, the shape of the uniformly illuminated light spot in the plane of film N may be defined so that it is an embodiment of light spot X by providing in screen 15 not the rectangular opening 16 but an opening whose outline corresponds to the shape of a particular embodiment of light spot X. If, for example, it is desired to form in the plane of film N the uniformly illuminated light spot 70 bounded by inclined edge 71 (Fig. 7), there is provided in screen 15 the opening 18, shown in Fig. 17, whose outline corresponds to this shape of light spot 70. The dimensions of opening 18 have been shown in Fig. 17 by way of example as being those of light spot 70 as shown in Fig. 7. However, the dimensions of opening 18 may also be larger or smaller than the dimensions of light spot 70, their size in a given actual embodiment of the optical system of Figs. 1 and 2 depending upon the ratio of imagery given to spherical lens 13.

There is another way of forming the uniformly illuminated light spot X in the plane of film N of the optical system of Figs. 1 and 2. This way consists in retaining the rectangular opening 16, or any other suitable opening, in screen 15 and providing adjacent to the plane of film N an additional screen 19 with an opening whose outline corresponds to the shape of a light spot embodying light spot X, for example opening 18, as shown in Fig. 18. The resulting arrangement is illustrated in Fig. 19 which is a section along the axis of the optical system of Figs. 1 and 2 showing the parts thereof from lamp filament 10 up to, and including, film N. It should be noted that screen 19 may be placed on either side of the plane of film N, that is, between this plane and either spherical lens 13 as shown in the drawings, or cylindrical lens 30. The dimensions of the opening in screen 19 are approximately those which it is desired to give to the light spot to be formed in the plane of film N, and care must be taken that the opening in screen 19 is fully covered by the image of the opening in screen 15 formed in the plane of film N by spherical lens 13, as indicated in Fig. 18 by the broken line 17a.

In the above explanations, the present invention has been described by way of example as applied to the optical system of Figs. 1 and 2 which are identical with Figs. 1 and 2 of application Serial No. 449,798. However, the present invention may likewise be applied to the other optical systems disclosed in that application. For example, screen 15 may be provided with opening 18, or any other opening whose outline corresponds to the shape of a light spot embodying light spot X, also in the optical system of Figs. 6 and 7 of application Serial No. 449,798. Alternatively, additional screen 19 may be placed adjacent to the plane of film N of this optical system in the manner explained hereinabove in connection with Figs. 18 and 19.

The present invention may furthermore be applied to the optical system of Figs. 8 and 9 of application Serial No. 449,798 when it is employed with screen 15 placed adjacent to the plane of film N and screen 35 placed in front of the plane of film P, as disclosed in the description of that application. In this case, screen 15 may be provided, in place of rectangular opening 16, with an opening of such an outline as to restrict to the shape of the desired embodiment of light spot X the uniformly illuminated light spot which, in the optical system of Figs. 8 and 9 of application Serial No. 449,798, is formed in the plane of film N by the action of spherical condenser 12. In the same manner, the present invention may be applied when the arrangement for forming a uniformly illuminated light spot in the plane of film N shown in Figs. 8 and 9 of application Serial No. 449,798 is employed with the optical system of Figs. 6 and 7 of that application as disclosed in the description thereof.

Moreover, the application of the present invention is not limited to the optical systems of application Serial No. 449,798, but the present invention may also be applied in substantially the same manner, and to the same advantages, to the optical systems disclosed and claimed in Patent No. 2,366,040. Considering first the optical systems shown in Figs. 4 and 5, Figs. 7 and 8, and Figs. 9 and 10, of Patent No. 2,366,040, the present invention may be applied thereto in the same manner as to the optical system of Figs. 1 and 2 of this application. That is to say, the present invention may be applied to those optical systems either by providing in screen 15 opening 18, or any other opening whose outline corresponds to the shape of a light spot embodying light spot X, or by placing screen 19 provided with such an opening adjacent to the plane of film N and retaining screen 15 with rectangular opening 16 or any other suitable opening.

As disclosed in the description of Patent No. 2,366,040, screen 15 may be placed adjacent to the plane of film N and screen 35 in front of the plane of film P in the modification of the optical system of Figs. 7 and 8 of that application which is shown in Figs. 13 and 14 thereof. In this case, the present invention may be applied by providing in screen 15, in place of rectangular opening 16, an opening of such an outline as to restrict to the shape of the desired embodiment of light spot X the uniformly illuminated light spot which, in the optical system of Figs. 13 and 14 of Patent No. 2,366,040, is formed in the plane of film N by the action of spherical condenser 12. In the same manner, the present invention may be applied when the arrangement for forming a uniformly illuminated light spot in the plane of film N shown in Figs. 13 and 14 of Patent No. 2,366,040 is employed with the optical systems of Figs. 4 and 5 and Figs. 9 and 10 of that application as disclosed in the description thereof.

In the modification of the optical system of Figs. 4 and 5 of Patent No. 2,366,040 which is shown in Figs. 11 and 12 thereof, screen 15 is placed adjacent to the field lens. In this case, too, the present invention may be applied by providing in screen 15, in place of rectangular opening 16, an opening of such an outline as to restrict to the shape of the desired embodiment of light spot X the image formed, in the optical system of Figs. 11 and 12 of Patent No. 2,366,040, at point A by objective 20 of the uniformly illuminated light spot which, in its turn, is formed in the plane of film N of this optical system by the action of spherical condenser 12. Since the image formed at said point A is an enlarged one, the opening in screen 15 can be made in this case on an enlarged scale and therefore more accurately, which is particularly advantageous when its outline is of a complicated character, for example, when the outline is to correspond to the shape of light spots 90 (Fig. 9) or 190 (Fig. 15A.) The same advantage may be enjoyed by placing additional screen 19 with an opening whose outline corresponds to the shape of a light spot embodying light spot X, adjacent to the field lens in the optical system of Figs. 4 and 5 of Patent No. 2,366,040.

It should be noted that it is immaterial for the application of the present invention to the optical systems of Patent No. 2,366,040 whether the field lens employed therein is spherical as is lens 25 shown in Figs. 4 and 5 and 7 to 12 of that application, or cylindrical with its cylinder axis vertical, as is cylindrical lens 45 shown in Figs. 13 and 14 thereof.

It will thus be seen that, in the optical systems disclosed and claimed in application Serial No. 449,798 and Patent No. 2,366,040 the light spot embodying the uniformly illuminated light spot X may be formed in the plane of film N and, in some of the optical systems of Patent No. 2,366,040, alternatively also at a position where a uniformly illuminated light spot formed in the plane of film N is imaged by means acting in both the vertical and horizontal planes. In the first mentioned case, the opening whose outline corresponds to the shape of light spot X may be either in screen 15, screen 15 being placed either adjacent to the plane of film N or at a position where the opening therein may be imaged in the plane of film N by the action of spherical lens 13, or it may be in additional screen 19 which is placed adjacent to the plane of film N. In the second mentioned case, the opening may be either in screen 15 or in screen 19, either screen being placed adjacent to the field lens and objective 20 being in both cases the means acting in both the vertical and horizontal planes referred to above. When placed adjacent to the plane of film N or the field lens, screen 15 and screen 19 may be placed on either side of the plane of film N or the field lens as has been pointed out hereinabove in connection with the positioning of screen 19 in the optical system of Figs. 1 and 2.

The opening in screen 15, or in additional screen 19, has been described hereinabove as an opening whose outline corresponds to the shape of a particular embodiment of the uniformly illuminated light spot X. As illustrated by the relationship between opening 18 (Figs. 17 and 18) and light spot 70 (Fig. 7), this description means that, in general, this opening has two horizontal edges whose distance from one another, that is, the height of the opening, varies and that, in particular, its height varies in the manner characteristic for the embodiment of light spot X to whose shape its outline corresponds. Furthermore, in case that its outline corresponds to the shape of an embodiment of light spot X for use with a symmetrical variable area sound track such as sound tracks S1 and S2 (Figs. 11A and 11B), the opening has a vertical center line about which it is symmetrical so that its height varies in the same sense on both sides of its center line. The opening then defines the uniformly illuminated light spot embodying light spot X in such a manner that it has a vertical center line which is in alignment with the vertical center line of the symmetrical variable area sound track when film N moves vertically through its plane. This condition must be satisfied when the light spot embodying the uniformly illuminated light spot X is formed in the plane of film N—as illustrated, by way of example, in Figs. 11A and 11B —and also when, in the cases referred to in the preceding paragraph, it is formed at a position where a uniformly illuminated light spot formed in the plane of film N is imaged by means acting in both the vertical and horizontal planes.

In the foregoing description of the present invention, and in the appended claims, the term "straight," in contradistinction to the term "curved," is used with reference to the edge of a light spot, or an opening, as meaning that the contour of either the entire edge, or of every one of its parts, is a first degree curve. Straight edges within the meaning of the term as used throughout this specification therefore are, for example, edge 78 of light spot 70a (Fig. 7A) and edge 171 of light spot 170 (Fig. 11A) as well as edge 71 of light spot 70 (Fig. 7).

What is claimed is:

1. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a height, and said height of said opening varying in linear relation to the slope of the curve representing that relationship between said width of said transparent portion and said exposure of said positive film which results in a substantially linear relationship between said width and said light transmission of said variable density sound track after said positive film has been developed.

2. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having two horizontal edges, said horizontal edges being at a distance from one another, and at least one of said horizontal edges being curved in such a manner that said distance varies in linear relation to the slope of the curve representing that relationship between said width of said transparent portion and said exposure of said positive film which results in a substantially linear relationship between said width and said light transmission of said variable density sound track after said positive film has been developed.

3. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a height, and said height of said opening varying in linear relation to the slope of a curve representing a relationship between said width of said transparent portion and said exposure of said positive film which results in a non-linear relationship between said width and said light transmission of said variable density sound track after said positive film has been developed, said non-linear relationship being such that, when a print is made of said variable density sound track, the light transmission of said print after development thereof is substantially linearly related to said width.

4. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having two horizontal edges, said horizontal edges being at a distance from one another, and at least one of said horizontal edges being curved in such a manner that said distance varies in linear relation to the slope of a curve representing a relationship between said width of said transparent portion and said exposure of said positive film which results in a non-linear relationship between said width and said light transmission of said variable density sound track after said positive film has been developed, said non-linear relationship being such that, when a print is made of said variable density sound track, the light transmission of said print after development thereof is substantially linearly related to said width.

5. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a height, and said height of said opening varying in linear relation to the slope of a curve representing a relationship between said width of said transparent portion and said exposure of said positive film which results in a non-linear relationship between said width and said light transmission of said variable density sound track after said positive film has been developed.

6. In a printing optical system wherein a uniformly illuminated light spot is more or less obscured when a negative film having thereon a variable area sound track whose transparent portion varies in width, moves vertically through a first plane; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track is produced on said positive film; the provision of means defining the height of said uniformly illuminated light spot: said defining means including a screen with an opening having a height, and said height of said opening varying in linear relation to the slope of a curve representing a non-linear relationship between said width of said transparent portion and said exposure of said positive film.

7. In a printing optical system wherein a uniformly illuminated light spot is more or less obscured when a negative film moves vertically through a first plane, said negative film having thereon a variable area sound track which is symmetrical about its vertical center line, and whose transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a vertical center line and a height, and said height of said opening varying in the same sense on both sides of said last mentioned center line and in linear relation to the slope of the curve representing that relationship between said width of said transparent portion and said exposure of said positive film which results in a substantially linear relationship between said width and said light transmission of said variable density sound track after said positive film has been developed; said opening being symmetrical about said last mentioned center line and defining said uniformly illuminated light spot in such a manner that said uniformly illuminated light spot has a vertical center line which is in alignment with said first mentioned center line when said negative film moves through said first plane.

8. In a printing optical system wherein a uniformly illuminated light spot is more or less obscured when a negative film moves vertically through a first plane, said negative film having thereon a variable area sound track which is symmetrical about its vertical center line, and whose transparent portion is divided in two by its opaque portion and varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a vertical center line and two horizontal edges, said horizontal edges being at a distance from one another, and at least one of said horizontal edges being curved in such a manner that said distance varies in linear relation to the slope of the curve representing that relationship between said width of said transparent portion and said exposure of said positive film which results in a substantially linear relationship between said width and said light transmission of said variable density sound track after said positive film has been developed; said horizontal edges being so disposed with respect to said last mentioned center line that said last mentioned center line is equal to said distance for the maximum value of said width, and said opening being symmetrical about said last mentioned center line and defining said uniformly illuminated light spot in such a manner that said uniformly illuminated light spot has a vertical center line which is in alignment with said first mentioned center line when said negative film moves through said first plane.

9. In a printing optical system wherein a uniformly illuminated light spot is more or less obscured when a negative film moves vertically through a first plane, said negative film having thereon a variable area sound track which is symmetrical about its vertical center line, and whose undivided transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot; said defining means including a screen with an opening having a vertical center line and two horizontal edges, said horizontal edges being at a distance from one another, and at least one of said horizontal edges being curved in such a manner that said distance varies in linear relation to the slope of the curve representing that relationship between said width of said transparent portion and said exposure of said positive film which results in a substantially linear relationship between said width and said light transmission of said variable density sound track after said positive film has been developed; said horizontal edges being so disposed with respect to said last mentioned center line that said last mentioned center line is equal to said distance for the zero value of said width, and said opening being symmetrical about said last mentioned center line and defining said uniformly illuminated light spot in such a manner that said uniformly illuminated light spot has a vertical center line which is in alignment with said first mentioned center line when said negative film moves through said first plane.

10. In a printing optical system wherein a uniformly illuminated light spot is more or less obscured when a negative film moves vertically through a first plane, said negative film having thereon a variable area sound track which is symmetrical about its vertical center line, and whose transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot; said defining means including a screen with an opening having a vertical center line and a height, and said height of said opening varying in the same sense on both sides of said last mentioned center line and in linear relation to the slope of a curve representing a relationship between said width of said transparent portion and said exposure of said positive film which results in a non-linear relationship between said width and said light transmission of said variable density sound track after said positive film has been developed, said non-linear relationship being such that, when a print is made of said variable density sound track, the light transmission of said print after development thereof is substantially linearly related to said width; said opening being symmetrical about said last mentioned center line and defining said uniformly illuminated light spot in such a manner that said uniformly illuminated light spot has a vertical center line which is in alignment with said first mentioned center line when said negative film moves through said first plane.

11. In a printing optical system wherein a uniformly illuminated light spot is more or less obscured when a negative film moves vertically through a first plane, said negative film having thereon a variable area sound track which is symmetrical about its vertical center line, and whose transparent portion is divided in two by its opaque portion and varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a vertical center line and two horizontal edges, said horizontal edges being at a distance from one another, and at least one of said horizontal edges being curved in such a manner that said distance varies in linear relation to the slope of a curve representing a relationship between said width of said transparent portion and said exposure of said positive film which results in a non-linear relationship between said width and said light transmission of said variable density sound track after said positive film has been developed, said non-linear relationship being such that, when a print is made of said variable density sound track, the light transmission of said print after development thereof is substantially linearly related to said width; said horizontal edges being so disposed with respect to said last mentioned center line that said last mentioned center line is equal to said distance for the maximum value of said width, and said opening being symmetrical about said last mentioned center line and defining said uniformly illuminated light spot in such a manner that said uniformly illuminated light spot has a vertical center line which is in alignment with said first mentioned center line when said negative film moves through said first plane.

12. In a printing optical system wherein a uniformly illuminated light spot is more or less obscured when a negative film moves vertically through a first plane, said negative film having thereon a variable area sound track which is symmetrical about its vertical center line, and whose undivided transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a vertical center line and two horizontal edges, said horizontal edges being at a distance from one another, and at least one of said horizontal edges being curved in such a manner that said distance varies in linear relation to the slope of a curve representing a relationship between said width of said transparent portion and said exposure of said positive film which results in a non-linear relationship between said width and said light transmission of said variable density sound track after said positive film has been developed, said non-linear relationship being such that, when a print is made of said variable density sound track, the light transmission of said print after development thereof is substantially linearly related to said width; said horizontal edges being so disposed with respect to said last mentioned center line that said last mentioned center line is equal to said distance for the zero value of said width, and said opening being symmetrical about said last mentioned center line and defining said uniformly illuminated light spot in such a manner that said uniformly illuminated light spot has a vertical center line which is in alignment with said first mentioned center line when said negative film moves through said first plane.

13. In a printing optical system wherein a uniformly illuminated light spot is more or less obscured when a negative film moves vertically through a first plane, said negative film having thereon a variable area sound track which is symmetrical about its vertical center line, and whose transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track having a light transmission is produced on said positive film; the provision of means defining the height of said uniformly illuminated light spot: said defining means including a screen with an opening having a vertical center line and a height, and said height of said opening varying in the same sense on both sides of said last mentioned center line and in linear relation to the slope of a curve representing a relationship between said width of said transparent portion and said exposure of said positive film which results in a non-linear relationship between said width and said light transmission of said variable density sound track after said positive film has been developed; said opening being symmetrical about said last mentioned center line and defining said uniformly illuminated light spot in such a manner that said uniformly illuminated light spot has a vertical center line which is in alignment with said first mentioned center line when said negative film moves through said first plane.

14. In a printing optical system wherein a uniformly illuminated light spot is more or less obscured when a negative film moves vertically through a first plane, said negative film having thereon a variable area sound track which is symmetrical about its vertical center line, and whose transparent portion varies in width; and wherein light flux emanating from said uniformly illuminated light spot is, in the vertical plane, focused at a position and, in the horizontal plane, diffused at said position, whereby a light spot of vertically varying illumination is formed at said position; and wherein light flux emanating from said light spot of vertically varying illumination effects the exposure of a positive film when said positive film moves vertically through a second plane, whereby a variable density sound track is produced on said positive film; the provision of means defining the height of said uniformly illuminated light spot: said defining means including a screen with an opening having a vertical center line and a height, and said height of said opening varying in the same sense on both sides of said last mentioned center line and in linear relation to the slope of a curve representing a non-linear relationship between said width of said transparent portion and said exposure of said positive film; said opening being symmetrical about said last mentioned center line and defining said uniformly illuminated light spot in such a manner that said uniformly illuminated light spot has a vertical center line which is in alignment with said first mentioned center line when said negative film moves through said first plane.

JOHN A. MAURER, Jr.